(12) United States Patent
Arito et al.

(10) Patent No.: US 6,476,090 B1
(45) Date of Patent: Nov. 5, 2002

(54) PHENOLIC FOAM

(75) Inventors: Yuichi Arito, Saitama (JP); Kenji Takasa, Kanagawa (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/720,925

(22) PCT Filed: Jul. 2, 1999

(86) PCT No.: PCT/JP99/03567

§ 371 (c)(1),
(2), (4) Date: Dec. 28, 2000

(87) PCT Pub. No.: WO00/01761

PCT Pub. Date: Jan. 13, 2000

(30) Foreign Application Priority Data

Jul. 3, 1998 (JP) .......................................... 10-189314

(51) Int. Cl.⁷ ................................................. C08J 9/14
(52) U.S. Cl. .......................... 521/98; 521/131; 521/181
(58) Field of Search ........................... 521/181, 98, 131

(56) References Cited

U.S. PATENT DOCUMENTS 4,033,910 A * 7/1977 Papa
4,369,259 A * 1/1983 Tiroux et al.
4,370,424 A * 1/1983 Baumann
5,397,807 A * 3/1995 Hitchcock et al.
6,013,689 A * 1/2000 Rader

FOREIGN PATENT DOCUMENTS

JP 11-140216 5/1999
JP 11-172033 6/1999

* cited by examiner

Primary Examiner—Morton Foelak
(74) Attorney, Agent, or Firm—Pennie & Edmonds LLP

(57) ABSTRACT

A phenolic foam having a density of from 10 kg/m³ to 100 kg/m³ and comprising a phenolic resin base part and a cellular part most of which is made up of a large number of fine cells, wherein the fine cells contain a hydrocarbon and have an average cell diameter of 5 μm to 200 μm, and the cell walls of at least most of the fine cells are formed of a smooth surface of the phenolic resin base. While the blowing agent is a hydrocarbon, the foam has a thermal conductivity comparable to that of a conventional foam made with a flon blowing agent, undergoes no change in thermal conductivity with time, exhibits excellent mechanical strength such as compressive strength, and has reduced brittleness.

15 Claims, 7 Drawing Sheets

5µm

5μm

5μm

10cm

10cm

PHENOLIC FOAM

TECHNICAL FIELD

This invention relates to a phenolic foam for heat insulation which is excellent in heat insulating performance and mechanical strength and is environment-friendly.

BACKGROUND ART

Phenolic foam is useful as various constuctional materials because of its superiority among resin foams particularly in flame retardance, heat resistance, low fuming properties, dimensional stability, solvent resistance, and fabricability.

Phenolic foam is generally produced by expanding and curing a foamable composition prepared by uniformly mixing a resol resin obtained by polymerization of phenol and formalin in the presence of under an alkaline catalyst, a blowing agent, a surface active agent, a curing catalyst, and other additives.

Blowing agents known for phenolic foam include so-called CFCs such as trichlorotrifluoroethane (CFC-113) and trichloromonofluoromethane (CFC-11), HCFCs such as dichlorotrifluoroethane (HCFC-123) and dichlorofluoroethane (HCFC-141b), HFCs such as 1,1,1,2-tetrafluoroethane (HFC-134a) and 1,1-difluoroethane (HFC-152a), and hydrocarbons such as cyclohexane, cyclopentane, and normal pentane (hereinafter referred to as HCs).

Among them CFCs have been used for preference for their advantages that they can be prepared with high safety, the gas they generate has a low thermal conductivity, they exhibit excellent expanding properties in resol resins and easily form fine closed cells on expansion, and the resulting foams have a low thermal conductivity.

However, it recently turned out that CFCs and HCFCs decompose ozone in the stratosphere to cause destruction of the ozonophere. These substances have now been recognized as a world issue as a cause of global environmental destruction, and global restrictions have been imposed on their production and use.

HFCs and HCs which do not destroy the ozonophere have then been attracting attention as a blowing agent. Note is taken particularly of use of HCs as a blowing agent because of their smaller coefficient of global warming than HFCs'.

HFCs and HCs are, however, difficult to apply as a blowing agent to phenolic foam on an industrial scale for such reasons as poor expanding performance. In particular, application of an HC blowing agent has not yet succeeded in obtaining a phenolic foam with satisfactory heat insulating performance on account of the high thermal conductivity of the blowing agent itself.

WO97/08230 proposes a process of making a phenolic foam having a low thermal conductivity by use of a hydrocarbon blowing agent, in which a resol resin containing substantially no free formaldehyde is used, stating that a phenolic foam having an initial thermal conductivity of 0.0181 (kcal/m·hr·° C.) was obtained. Although the description states that the phenolic foam shows a small increase in thermal conductivity, the thermal conductivity of the phenolic foam shows a 10% or more increase up to 0.020 (kcal/m·hr·° C.) after 200 days. Further, the phenolic foam has fine holes in the cell walls as demonstrated in Comparative Example 7 of the present invention. The large change of thermal conductivity with time is assumed attributable to gradual displacement of the blowing agent with air through the fine holes of the cell walls.

JP-W-4-503829 (The term "JP-W" used herein means a "published Japanese national stage of international application") reports that addition of a fluorocarbon to a hydrocarbon blowing agent leads to production of a phenolic foam with satisfactory heat insulating properties, giving Example in which a phenolic foam having a thermal conductivity of 0.0186 W/m·K was obtained by using a pentane blowing agent to which a perfluorocarbon had been added. However, a phenolic foam prepared in accordance with the description of the Example was found to have fine holes in the cell walls as revealed in Comparative Example 8 of the present invention. Addition of a perfluorocarbon, being expensive, creates another problem that the production cost will increase.

As stated above, we have had no phenolic foams which are produced by using a hydrocarbon-containing blowing agent and yet exhibit satisfactory heat insulating performance, excellent mechanical strength, such as compressive strength, and reduced brittleness.

An object of the present invention is to provide a phenolic foam which has a low thermal conductivity despite use of an HC as a blowing agent, undergoes little change in thermal conductivity with time, and has excellent mechanical strength, such as compressive strength, and reduced brittleness.

DISCLOSURE OF THE INVENTION

The present inventors found that a resol resin whose reactivity falls within a specific range provides a phenolic foam having the cellular structure as defined in the present invention when produced under specific conditions of expansion and curing, the above object of the invention can be achieved thereby. The present invention has been completed based on this finding.

The present invention provides:

(1) A phenolic foam having a density of 10 kg/m$^3$ to 100 kg/m$^3$ and containing a hydrocarbon, which is characterized by having an average cell diameter in a range of from 5 μm to 200 μm, a void area ratio of 5% or less in its cross section, and substantially no holes in the cell walls;

(2) The phenolic foam according to the above (1), which has a closed cell ratio of 80% or more, a thermal conductivity of 0.022 kcal/m·hr·° C. or less, and a brittleness of 30% or less;

(3) The phenolic foam according to the above (1) or (2), wherein the hydrocarbon is a constituent of a blowing agent;

(4) The phenolic foam according to the above (3), wherein the blowing agent comprises 50% by weight or more of the hydrocarbon;

(5) The phenolic foam according to the above (4), wherein the blowing agent contains 0.1 to 100 parts by weight of a fluorohydrocarbon per 100 parts by weight of the hydrocarbon;

(6) The phenolic foam according to any one of the above (1) to (5), wherein the hydrocarbon is at least one compound selected from isobutane, normal butane, cyclobutane, normal pentane, isopentane, cyclopentane, and neopentane;

(7) The phenolic foam according to any one of the above (1) to (6), wherein the hydrocarbon is a mixture of 5 to 95% by weight of a butane selected from isobutane, normal butane and cyclobutane and 5 to 95% by weight of a pentane selected from normal pentane, isopentane, cyclopentane and neopentane;

(8) The phenolic foam according to the above (7), wherein the hydrocarbon is a mixture of 5 to 95% by weight of isobutane and 5 to 95% by weight of normal pentane and/or isopentane;

(9) The phenolic foam according to the above (5), wherein the fluorohydrocarbon is at least one compound selected from 1,1,1,2-tetrafluoroethane, 1,1-difluoroethane and pentafluoroethane;

(10) A process for producing a phenolic foam, comprising mixing a resol resin having a viscosity increase rate constant of 0.005 to 0.5, a water content of 4 to 12% by weight and a viscosity of 1000 to 30000 cps at 40° C., a surface active agent, a hydrocarbon-containing blowing agent, and a curing catalyst in a mixing machine having a temperature of 10 to 70° C. and a pressure of from the vapor pressure of the blowing agent to the blowing agent's vapor pressure plus 5 kg/cm$^2$, expanding the mixture, and elevating the temperature stepwise in a subsequent curing reaction stage;

(11) The process for producing a phenolic foam according to the above (10), wherein the hydrocarbon-containing blowing agent comprises 50% by weight or more of a hydrocarbon; and

(12) The process for producing a phenolic foam according to the above (11), wherein the blowing agent contains 0.1 to 100 parts by weight of a fluorohydrocarbon per 100 parts by weight of the hydrocarbon.

BRIEF DESCRIPTION OF THE DRAWINGS

FIG. 1 is schematic illustrations of the cell wall structures of phenolic foams, in which

Figure 1B:
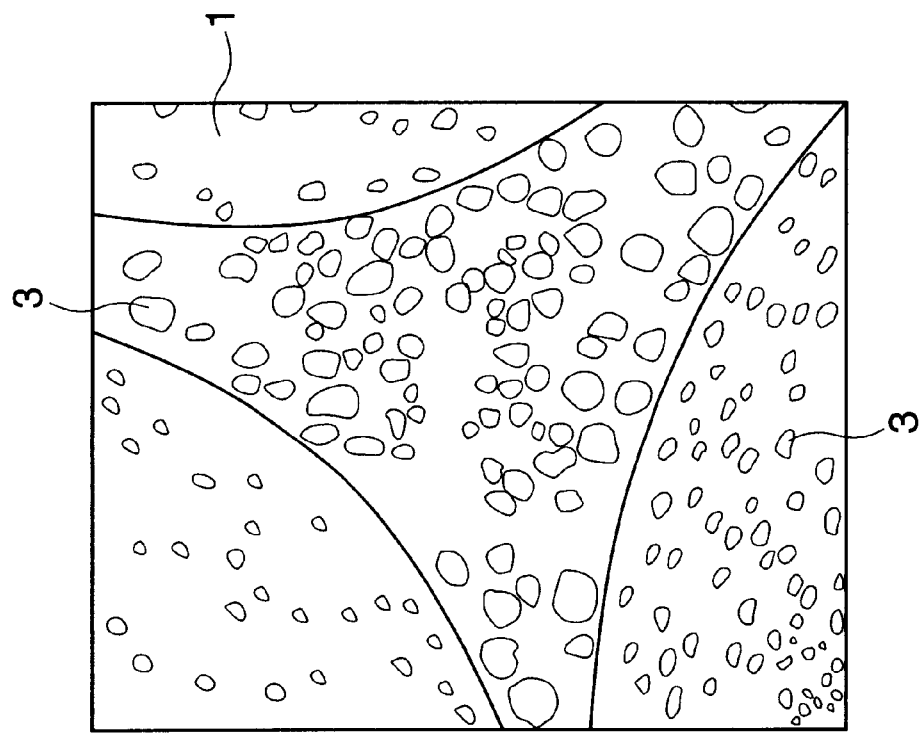
FIG. 1b is a schematic illustration of the cell wall structure according to a conventional technique wherein the cell wall has holes or depressions.

In Figures numeral 1 indicates the surface of a cell wall; 2; a cell wall cut surface; and 3; a hole or a depression.

BEST MODE FOR CARRYING OUT THE INVENTION

The phenolic foam according to the present invention is one produced by using a hydrocarbon-containing blowing agent. The hydrocarbon content in the blowing agent is preferably 50% by weight or more, still preferably 70% by weight or more, particularly preferably 90% by weight or more. With a hydrocarbon content less than 50% by weight, the blowing agent will have an unfavorably increased coefficient of global warming.

The hydrocarbons which can be incorporated into the blowing agent used for production of the phenolic foam of the invention preferably include cyclic or acyclic alkanes, alkenes and alkynes having 3 to 7 carbon atoms. From the standpoint of expansion performance, chemical stability (having no double bond), their own thermal conductivity, and the like, alkanes or cycloalkanes having 4 to 6 carbon atoms are still preferred. Specific examples are normal butane, isobutane, cyclobutane, normal pentane, isopentane, cyclopentane, neopentane, normal hexane, isohexane, 2,2-dimethylbutane, 2,3-dimethylbutane, and cyclohexane. Particularly preferred of them are pentanes, i.e., normal pentane, isopentane, cyclopentane and neopentane; and butanes, i.e., normal butane, isobutane and cyclobutane, because of their suitable expansion characteristics in the production of the phenolic foam according to the invention and their relatively small thermal conductivity.

In the present invention these hydrocarbons can be used as a mixture of two or more thereof. For example, mixtures comprising 5 to 95% by weight of a pentane and 5 to 95% by weight of a butane are preferred for their satisfactory heat insulating properties over a broad temperature range. Mixtures comprising 25 to 75% by weight of a pentane and 25 to 75% by weight of a butane are still preferred. Inter alia, mixtures of normal pentane or isopentane and isobutane are preferred; because they secure excellent heat insulating performance over a broad temperature range from a low temperature region (e.g., heat insulators for freezers of about −80° C.) to a high temperature region (e.g., heat insulators for heating elements of about 200° C.) and also because the compounds are relatively cheap, which is economically advantageous.

Where the hydrocarbon is used in combination with HFCs having a low boiling point, such as 1,1,1,2-tetrafluoroethane, 1,1-difluoroethane, and pentafluoroethane, as a blowing agent, the low temperature characteristics of the phenolic foam can be improved. The HFCs can be used in an amount of from 0.1 to 100 parts by weight, preferably 5 to 90 parts by weight, per 100 parts by weight of the hydrocarbon blowing agent. A mixed blowing agent comprising more than 100 parts by weight of HFCs has an increased coefficient of global warming, which is unfavorable. The effect in improving low temperature characteristics is small with a smaller HFC content than 0.1 part by weight.

For the purpose of controlling the foam initiating time, a low-boiling substance, such as nitrogen, air, helium or argon, can be added to the blowing agent as a foam nucleating agent in such an amount that does not impair the cellular structure. A preferred amount of the foam nucleating agent to be added is 0.05 to 5 mol %. If the amount of the foam nucleating agent exceeds 5 mol %, expansion tends to take place non-uniformly, or the void tends to increase.

The phenolic foam according to the invention has a density of 10 kg/m$^3$ or more, preferably 15 kg/m$^3$ or more, still preferably 20 kg/m$^3$ or more, and 100 kg/m$^3$ or less, preferably 70 kg/m$^3$ or less, and still preferably 50 kg/m$^3$ or less. If the density is less than 10 kg/m$^3$, the foam has reduced mechanical strength including compressive strength and is liable to break in handling due to increased brittleness, causing problems on practical use. If the density exceeds 100 kg/m$^3$, heat transfer in the resin part increases to reduce heat insulating performance.

The phenolic foam of the invention has a unique cellular structure having substantially no holes in the cell walls and comprising fine cells of 5 μm to 200 μm in average cell diameter. Having virtually no holes in the cell walls, the phenolic foam of the invention contains the hydrocarbon used as a blowing agent in the production. The hydrocarbon content in the phenolic foam of the invention is preferably 35% by weight or less, still preferably 20% by weight or less, and 0.05% by weight or more, still preferably 0.1% by weight or more. In general, foam is made up of fine spaces developed in a resin by vaporization of a blowing agent and a resin part existing among the spaces. In the present invention, the spaces are designated as cells, and the resin part as a cell wall(s). The cells are usually about 5 μm to 1 mm in size.

The phenolic foam of the invention has an average cell diameter of 5 μm or greater, preferably 10 μm or greater, and 200 μm or smaller, preferably 150 μm or smaller. Because cell walls have limited thinness, a phenolic foam having an average cell diameter of smaller than 5 μm is of necessity to have an increased density. This means that the resin parts' contribution to heat transfer increases, which results in insufficient heat insulation of the phenolic foam. If, on the other hand, the average cell diameter exceeds 200 μm, radiant heat conduction increases to lessen the heat insulating performance of the phenolic foam.

Phenolic foams have relatively large spherical or amorphous vacancies (usually about 1 mm or greater in diameter; hereinafter referred to as voids). It is considered that voids are generally formed due to joining of cells, non-uniform vaporization of the blowing agent, or entrapment of air, etc. in the stage of expansion. Voids not only cause reduction in compressive strength but impair the appearance. Voids are defined as follows in the present invention. A phenolic foam is cut in parallel to its front and rear sides, and the vacancies present on the cut surface are measured by the method hereinafter described. Vacancies having an area of 2 mm$^2$ or more are regarded as voids. The phenolic foam of the invention has such few voids that the total void area is 5% or less based on the total area of the cut surface. Accordingly the phenolic foam of the invention is characterized by small spread in compressive strength. Further, there is produced an extremely excellent effect that the phenolic foam of the invention is easy to handle even in the form of a thin foamed sheet of 10 mm or thinner which could be easily affected by voids and has been difficult to handle in application. Furthermore, the phenolic foam of the invention is practically no inferior in appearance to insulators of other materials. A preferred void is 3% or less, particularly 1% or less.

Figure 1A:
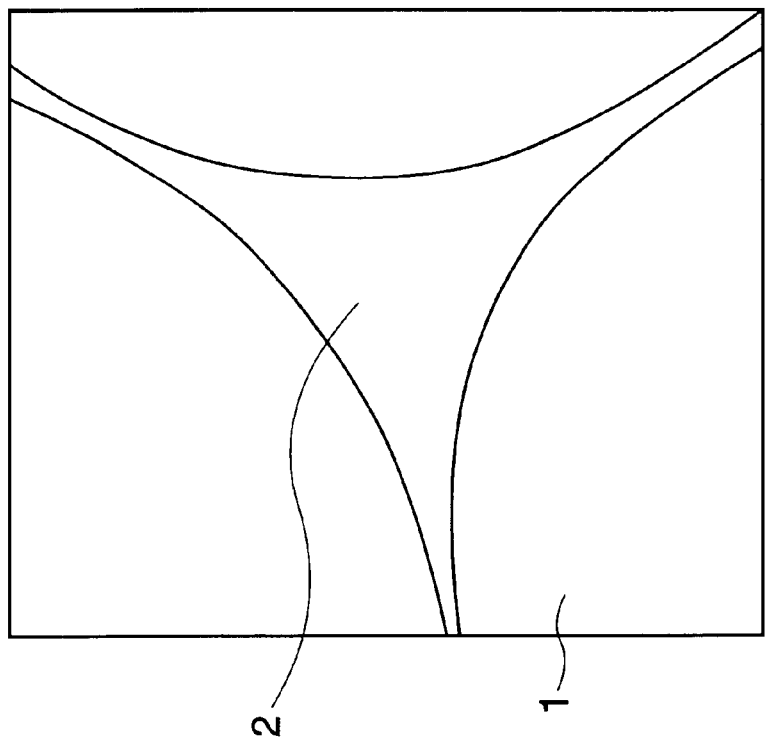
FIG. 1a is a schematic illustration of the cell wall structure according to the invention wherein the cell wall has substantially no holes.

The term "cell wall" as used herein means the phenolic resin part forming cells. In FIG. 1 are shown schematic illustrations of cell wall structures. The phenolic foam of the invention has the cell wall structure schematically shown in FIG. 1a. FIG. 1b schematically shows a conventionally produced phenolic foam obtained by using a hydrocarbon blowing agent. In FIG. 1b, a large number of holes or depressions (numeral 3 in FIG. 1) are observed on the cross section of the resin part surrounded by three cells (hereinafter referred to as a cell wall cut surface (numeral 2 in FIG. 2)) and on the surface of internal cells (hereinafter referred to as cell wall surface (numeral 1 in FIG. 1)). The holes or depressions usually have a diameter of 50 to 1000 nm, frequently piercing the cell wall.

The phenolic foam according to the invention has substantially no holes nor depressions on the cell wall cut surface and the cell wall surface as shown in FIG. 1a. The language "substantially no holes nor depressions in the cell wall" means that the cell wall cut surface has 10 or less, preferably 5 or less, holes or depressions per cell wall cut surface under electron microscopic observation.

The mechanism of forming such holes or depressions is believed to be that volatile components such as water separate and form lumps in a phenolic resin while the phenolic resin is curing and evaporate after the phenolic resin cures. It is said, in particular, that such holes or depressions accelerate replacement of the blowing agent with air, resulting in an increase in thermal conductivity. The present inventors consider that the existence of the holes or depressions constitutes one of main causes of the reduction in mechanical strength and the increase in brittleness of phenolic foams. The existence of the holes or depressions is known, and attempts to eliminate them are seen, e.g., in JP-A-53-13669 and JP-B-63-20460, in which CFCs are used as a blowing agent. The techniques proposed consist in preparing a foaming composition having an increased viscosity by using a resol resin having an extremely limited water content in JP-A-53-13669 or by using a high-molecular weight resol resin in JP-B-63-20460, thereby to improve the cell wall strength and to eliminate holes or depressions of the resin part. According to the present inventors' researches, where an HC blowing agent is applied to these techniques, it is difficult to handle the HC blowing agent and to raise the expansion ratio because of the increased viscosity of the foaming composition. Phenolic foams prepared by using HCs as a blowing agent which have substantially no holes nor depressions and exhibit high performance has been unknown.

By allowing a resol resin having specific reactivity to expand and cure under specific conditions, the phenolic foam structure of the present invention is obtained.

That is, in the present invention, a phenolic foam having a fine and uniform cellular structure with substantially no holes nor depressions in the cell wall cut surface and the cell wall surface and with a small void area can be obtained by preparing a foaming composition by mixing in a mixing machine under such conditions that expansion will have proceeded to some extent when the composition is taken out of the mixing machine, allowing the composition to expand further, transferring the composition to a curing reaction stage where the temperature is elevated stepwise while releasing volatile components into a gas phase until curing completes.

The phenolic foam of the invention preferably has a closed cell ratio of 80% or more, still preferably 85% or more, particularly preferably 90% or more. Where the closed cell ratio is less than 80%, the heat insulating performance tends to be reduced considerably with time because the rate of replacing the blowing agent in the cells with air increases. In addition, the foam will have increased brittleness, tending to fail to satisfy mechanical requirements for practice use.

The phenolic foam of the invention preferably has an initial thermal conductivity of 0.022 kcal/m·hr·° C. or less, still preferably 0.010 kcal/m·hr·° C. to 0.020 kcal/m·hr·° C. The phenolic foam of the invention also shows a reduced increase in thermal conductivity with time, which is an important characteristic as a heat insulator. The phenolic foam of the invention has an increase in thermal conductivity of 0.002 kcal/m·hr·° C. or less, preferably 0.001 kcal/m·hr·° C. or less, still preferably 0.0005 kcal/m·hr·° C. or less, after 300 days. Thus, the phenolic foam according to the present invention possesses excellent heat insulating performance.

It is preferred for the phenolic foam of the invention to have a brittleness of 30% or less, particularly 1 to 20%. The phenolic foam of the invention thus exhibits marked improvement on brittleness.

The process of producing the phenolic foam of the invention will be described.

The resol resin which can be used in the production of the phenolic foam is obtained by polymerizing phenol and formalin by heating at a temperature ranging from 40 to 100° C. in the presence of an alkali catalyst. If desired, additives such as urea may be added in the resol resin polymerization system. Where urea is added to the resol resin, it is preferable that urea be previously methylolated with an alkali catalyst. The methylolated urea is usually added in an amount of 1 to 30% by weight of the resol resin. Because the resol resin as synthesized generally contains excess water, the water content is adjusted to a level adequate to expansion. In the present invention, the water content is adjusted to 4% by weight or more, preferably 5% by weight or more, and 12% by weight or less, preferably 9% by weight or less. The resol resin to be expanded suitably has a viscosity of 1000 cps or more, preferably 3000 cps or more, and 30000 cps or less, preferably 2500 cps or less, at 40° C. Where additives such as urea are added to the resol resin, it is required for the resol resin as containing the additives to have the viscosity falling within the above-specified range.

In order to obtain the phenolic foam of the invention, curing reactivity of the starting resol resin (inclusive of the additives) is of importance. That is, the viscosity increase rate constant of the resol resin is 0.005 or more, preferably 0.01 or more, and 0.5 or less, preferably 0.35 or less, as obtained by the method hereinafter descried. If the viscosity increase rate constant is smaller than 0.005, the reactivity is so poor that the foaming composition is slow in raising the viscosity. It follows that the cell diameter becomes large, sometimes leading to foam breaks, and the foam performance is reduced. If the viscosity increase rate constant exceeds 0.5, the cell walls may be bored, or the curing proceeds so fast that the viscosity increases too much during mixing in a mixing machine, etc. As a result, the mixing machine tends to stop operating due to the elevated inner pressure or, in some cases, the resol resin may solidify completely in the mixing machine to break the mixing machine.

The phenolic foam of the present invention can be obtained by introducing a resol resin having moderate curability and having a moderately controlled viscosity, a blowing agent, a surface active agent, and a curing catalyst into a mixing machine and uniformly mixing them to obtain a foaming composition and allowing the foaming composition to expand and cure.

In general, the heat insulating performance and mechanical performance of foam depend largely on the fine cellular structure. In other words, to have a high closed cell ratio and an average cell diameter ranging from 5 to 200 $\mu$m is significant. In order to form such fine cells, it is important that foam initiation takes place concurrently within a short time. Foaming initiates on vaporization of a blowing agent by the heat of reaction when a resol resin is mixed with the blowing agent and a curing catalyst or by the heat mechanically generated by the mixing. Then cells grow to form a cellular structure. The cellular structure is heavily influenced by the compatibility of the blowing agent, the progress of vaporization of the blowing agent, the progress of crosslinking of the resol resin, and the like.

Control on the foam initiating point and the following cell growth is important for obtaining the cellular structure of the present invention. It is preferred that foaming initiates quickly after mixing the foaming composition and proceeds to some extent before the composition is taken out of the mixing machine. Such a state that a foaming composition has started expansion when it is taken out of the mixing machine is known as a froth-foamed state. In order to obtain the foam of the invention, it is important to control this state of foaming under specific conditions. This state of foaming is controllable by the temperature and the pressure while the foaming composition is being mixed. It is generally said that the inner pressure of a mixing machine should be higher to prevent premature expansion. In the present invention, the pressure of the mixing machine is controlled within a proper range with the vapor pressure and the boiling point of the blowing agent used being taken into consideration. Specifically, the pressure of the mixing machine is set at or above the vapor pressure of the blowing agent (or when the blowing agent is a mixture, the vapor pressure of the mixture) at the temperature in the mixing machine and at or below (the vapor pressure +5 kg/cm$^2$). If the pressure in the mixing machine is lower than the vapor pressure of the blowing agent, expansion proceeds too much in the mixing machine, and the cells gain in diameter to burst or join together into voids. On the other hand, If the pressure exceeds (the vapor pressure of the blowing agent +5 kg/cm$^2$), initiation of expansion or cell growth becomes non-uniform. It follows that the cells have increased spread in size, or void formation may be induced, making it difficult to obtain a satisfactory foam. The pressure of the mixing machine is preferably controlled between (the vapor pressure of the blowing agent +0.5 kg/cm$^2$) to (the vapor pressure of the blowing agent +3 kg/cm$^2$). The temperature in the mixing machine is 10° C. or higher, preferably 20° C. or higher, and 70° C. or lower, preferably 60° C. or lower. If the mixing machine temperature exceeds 70° C., formation of many voids can result even through the pressure falls within a proper range, or the pressure of the mixing machine may elevate too high to operate.

In order to induce foam initiation in a short time, a low-boiling substance, such as nitrogen, helium, argon or air, may previously be added to the blowing agent as a foam nucleating agent.

The curing reaction stage after expansion is also important for obtaining the foam of the invention. It is important to carry out curing reaction at a temperature increasing stepwise, i.e., the reaction is conducted in the initial stage at 70 to 90° C. for 1 minute to 1 hour and then at 90 to 100° C. for 10 minutes to 5 hours and, if desired, at 100 to 130° C. for 10 minutes to 3 hours. The temperature difference between steps is 5° C. or more, preferably 10° C. or more.

The curing catalyst which can be used in expansion and curing includes aromatic sulfonic acids, such as toluenesulfonic acid, xylenesulfonic acid, benzenesulfonic acid, phenolsulfonic acid, styrenesulfonic acid, and naphthalenesulfonic acid, and a mixture of two or more thereof. The curing catalyst is usually used in an amount of 1 to 30 parts by weight per 100 parts by weight of the resol resin. Resorcinol, cresol, saligenin (o-methylolphenol), p-methylolphenol, etc. may be added as a cure assistant. The cure assistant is usually added in an amount of 1 to 300 parts by weight based on the curing catalyst. These curing catalysts can be used as diluted with a solvent, such as diethylene glycol or ethylene glycol.

As a surface active agent for use in the present invention nonionic surface active agents are effective. Included are alkylene oxides which are ethylene oxide/propylene oxide copolymers, alkylene oxide/castor oil condensates, alkylene oxide/alkyl phenol (e.g., nonyl phenol or dodecyl phenol) condensates, fatty acid esters such as polyoxyethylene fatty acid esters, silicone compounds such as polydimethylsiloxane, and polyalcohols. These surface active agents can be used either individually or as a combination of two or more thereof. The surface active agent is preferably used in an amount of 0.3 to 10 parts by weight per 100 parts by weight of the resol resin.

Methods of evaluating the tissue, the structure and the characteristics of phenolic foams in the invention are then described.

The density as referred to in the invention is a value measured on a sample, having a 20 cm-side square surface, of a phenolic foam from which a facing material or a siding material, if any, has been removed. The weight and the apparent volume of the sample were measured, from which the density was obtained according to JIS K7222.

The number of holes or depressions in cell walls as referred to in the invention was measured as follows. A specimen of about 2 to 3 mm in thickness and about 1 $cm^2$ in area was cut with a trimming cutter out of a cut surface of a foam, the cut surface being in approximately the middle in the thickness direction of the foam and parallel with the front and back sides of the foam. The specimen was fixed on a mount, and gold was sputtered thereon (15 mA, 3 mins). A micrograph was taken of the cell wall cut surface under a scanning electron microscope (Hitachi S-800) at a magnification of 5000 times and observed. Ten cut surfaces were observed, and the counts of holes or depressions were averaged for making a judgement.

The void measurement in the present invention was made as follows. A phenolic foam sample was cut in parallel with the front and back sides in approximately the middle in the thickness direction. A 200% enlarged photocopy was taken of an area of 100 mm by 150 mm of the cut surface (the length and the width were doubled to increase the area four-fold). The areas of voids each occupying eight or more 1 mm-side squares of clear graph paper were added up to calculate the void area ratio. Being an enlargement, the eight squares correspond to a 2 $mm^2$ area on the actual foam cut surface.

The closed cell ratio was determined as follows. A cylindrical specimen having a diameter of 35 to 36 mm was cut out of a phenolic foam by means of a cork borer and trimmed to a height of 30 to 40 mm. The volume of the specimen was measured with a gravitometer of air comparison type (Model 1000, supplied by Tokyo Science) according to the standard usage as instructed. The difference between the specimen volume and the cell wall volume calculated from the specimen weight and the resin density is divided by the apparent volume calculated from the outer dimensions of the specimen is taken as a closed cell ratio, which is in accordance with ASTM D2856. The density of the phenolic resin was 1.27 $g/cm^3$.

The average cell diameter of a phenolic foam as referred to in the invention is a value obtained as follows. A foam was cut in parallel to the front and back sides at approximately the middle in the thickness direction, and a 50-fold enlarged photograph was taken of the cut surface. Four 9 cm-long straight lines were drawn on the photograph. The number of cells on each line (the number of cells as measured in accordance with JIS K6402) was counted, and an average of the counts was obtained. A length of 1800 $\mu$m divided by that average cell number was taken as an average cell diameter.

The compressive strength was measured in accordance with JIS K7220 on a sample having a 50 mm-side square surface. A specified strain was set at 0.05.

The thermal conductivity was measured on a specimen having a 200 mm-side square surface in accordance with a plate heat flow meter method of JIS A1412 between a 5° C. plate and a 35° C. plate.

The brittleness was measured as follows. Twelve 25±1.5 mm-side cubes were cut out of a foam in such a manner that at least one face of each cube is the molding skin surface or a facing material. Where a foam was thinner than 25 mm, the thickness of the foam could be the thickness of its specimen. Twenty-four 19±08 mm-side cubes of oak having been dried at room temperature and twelve test cubes were put in an oak-made box having internal dimensions of 191×197×197 mm that could be closed tight so that dust might not come out. The box was revolved 600±3 times at a speed of 60±2 rpm. After the revolution, the contents of the box were transferred to a net having a nominal dimension of 9.5 mm and sieved to remove small pieces. The test pieces remaining on the net were weighed, and the weight reduction ratio calculated based on the weight of the test cubes before testing was taken as a brittleness. The measurement is based on JIS A9511.

The hydrocarbon or fluorohydrocarbon present in a phenolic foam was measured as follows. A phenolic foam sample was put in a closed mixer and ground to destroy the cells. While being displaced with nitrogen, the gas phase was introduced into a gas absorbing tube containing pyridine. The hydrocarbon or fluorohydrocarbon dissolved in the pyridine was analyzed by gas chromatography.

The viscosity increase rate constant, which is an indication of curing reactivity, was obtained by the following method.

To a resol resin weighing about 10 g was added a precisely weighed 5 parts by weight, based on the resol resin, of a curing catalyst comprising 70 wt % of toluenesulfonic acid and 30 wt % of diethylene glycol, and mixed well for 1 minute. The mixture was set in a rotational viscometer (R100 Model Viscometer RE type, available from Tonen Sangyo K.K.), and the viscosity at 40° C. was measured at a 30 second interval. The measurement results were plotted on a semilogarithmic coordinates with the time as the X-axis and the logarithmic viscosity as the Y-axis. The plot from 4-minute to 10-minute was regarded as a straight line, the slope of which (1/min) was taken as a viscosity increase rate constant.

The viscosity of a resol resin was measured with a rotational viscometer at 40° C.

The water content of a resol resin was measured as follows. A resol resin was dissolved in dehydrated methanol (available from Kanto Kagaku K.K.) whose water content had been measured in a concentration of 3 wt % to 7 wt %. The water content of the resulting solution was measured to obtain the water content of the resol resin. The measurement was made with a Karl-Fischer moisture meter MKC-210 (available from Kyoto Denshi Kogyo K.K.).

The present invention will now be illustrated in greater detail with reference to the following Examples and Comparative Examples.

The resol resins used in Examples and Comparative Examples were prepared as follows.

SYNTHESIS OF RESOL RESIN A:

In a reactor were charged 3800 g of 50 wt % formalin (available from Mitsubishi Gas Chemical Co., Inc.) and 3000 g of 99 wt % phenol (available from Wako Pure Chemical Industries, Ltd.) and agitated with a propeller agitator. The liquid temperature in the reactor was adjusted to 40° C. with a temperature controller. To the mixture was added 66 g of a 50 wt % aqueous solution of sodium hydroxide, and the temperature of the reaction mixture was raised stepwise from 40° C. up to 85° C., at which the reaction mixture was maintained for 120 minutes. Then the reaction mixture was cooled to 5° C. The resultant reaction mixture was designated resol resin A-1. Separately, 1080 g of 50 wt % formalin, 1000 g of water, and 100 g of a 50% aqueous solution of sodium hydroxide were added to a reactor, and 1600 g of urea (guaranteed reagent, available from Wako Pure Chemical) was added thereto, followed by agitation with a propeller agitator. The liquid temperature of the reactor was adjusted to 40° C. with a temperature controller. The temperature of the reaction mixture was raised stepwise from 40° C. up to 70° C., at which the reaction mixture was maintained for 60 minutes. The resulting reaction mixture was designated methylolurea U.

Resol resin A-1 (6800 g) was mixed with 1140 g of methylolurea U, and the mixed liquid was heated to 60° C., at which it was maintained for 1 hour and then cooled to 30° C. The reaction mixture was neutralized to pH 6 with a 50 wt % aqueous solution of paratoluenesulfonic acid monohydrate, and the reaction mixture was dehydrated at 60° C. The resulting mixture was designated resol resin A.

SYNTHESIS OF RESOL RESIN B:

Resol resin A-1 was neutralized to pH 6 with a 50 wt % aqueous solution of paratoluenesulfonic acid monohydrate, followed by dehydration at 60° C. The resulting reaction mixture was designated resol resin B.

SYNTHESIS OF RESOL RESIN C:

Resol resin C was synthesized in the same manner as for resol resin A, except that the weight of the 50 wt % formalin was changed to 3200 g and that the weight of the methylolurea U to be added to 6000 g of the resol resin was changed to 770 g.

SYNTHESIS OF RESOL RESIN D:

Resol resin D was synthesized in the same manner as for resol resin A, except that the weight of the 50 wt % formalin was changed to 4200 g and that the weight of the methylolurea U to be added to 5000 g of the resol resin was changed to 610 g.

SYNTHESIS OF RESOL RESIN E:

Resol resin E was synthesized in the same manner as for resol resin C, except that the resol resin was neutralized and dehydrated without adding methylolurea U.

SYNTHESIS OF RESOL RESIN F:

Resol resin F was synthesized as follows. In a reactor were charged 4360 g of 50 wt % formalin and 3000 g of 99 wt % phenol and stirred with a propeller agitator. The liquid temperature in the reactor was adjusted to 40° C. by means of a temperature controller. To the reaction mixture was added 66 g of a 50% aqueous solution of sodium hydroxide, followed by heating. When the solution viscosity at 25° C. fell to 62 cSt, the reaction mixture was cooled to 30° C. and neutralized to pH 6 with a 50 wt % aqueous solution of paratoluenesulfonic acid monohydrate. Urea was added in an amount corresponding to 77 mol % based on the unreacted formaldehyde in the reaction mixture, and the reaction mixture was dehydrated.

SYNTHESIS OF RESOL RESIN G:

Resol resin G was synthesized as follows. A 37 wt % aqueous solution of formaldehyde (3850 g) (guaranteed reagent, available from Wako Pure Chemical) and 3000 g of 99 wt % phenol were mixed, and 85 g of a sodium hydroxide aqueous solution (10 N) was added thereto. The mixture was heated to 60° C. over 40 minutes, at which the mixture was kept for 30 minutes. The temperature was further raised to 80° C., at which the mixture was maintained for 30 minutes. The temperature was further elevated, and the mixture was refluxed for 40 minutes. Water was removed under reduced pressure, and 727 g (corresponding to a concentration of 13 wt % in the resol resin) of monoethylene glycol was added thereto to obtain resol resin G.

The water content, viscosity, and viscosity increase rate constant of the resol resins are shown in Table 1.

EXAMPLE 1

Figure 2:
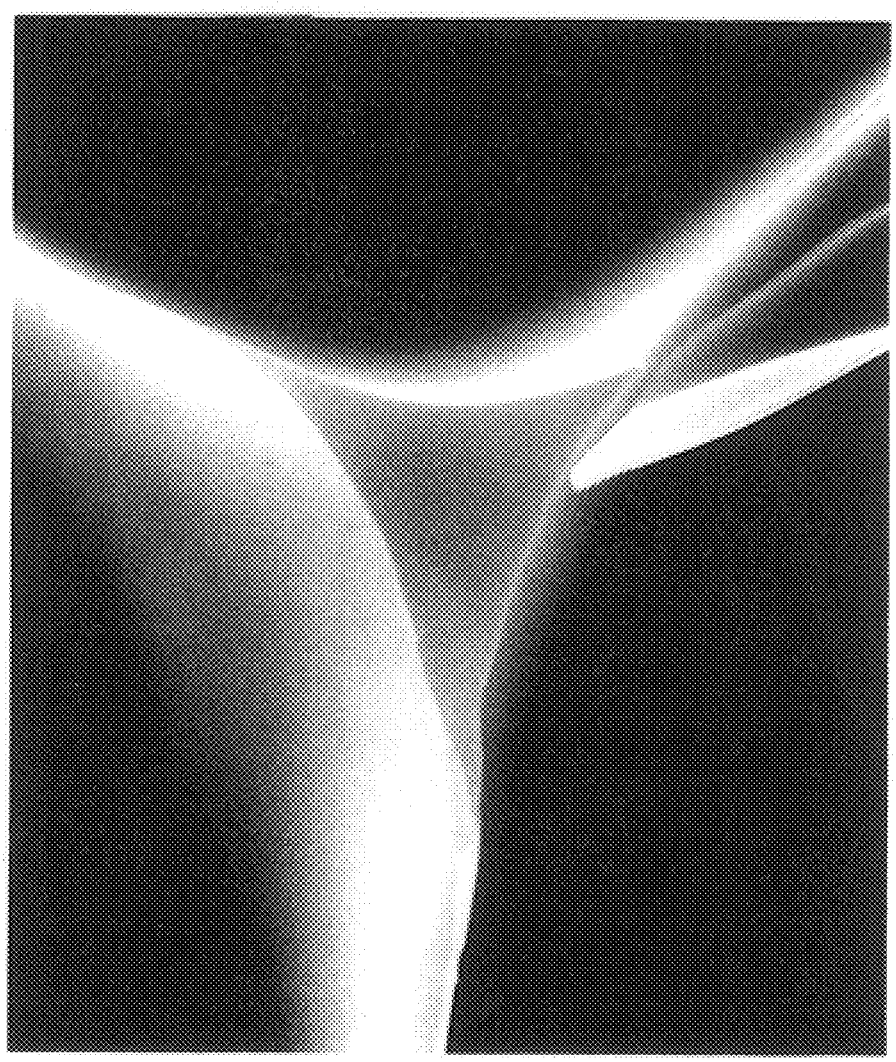
FIG. 2 is an electron micrograph taken of the cell wall cut surface of Example 1 which has no holes nor depressions.
Figure 6:
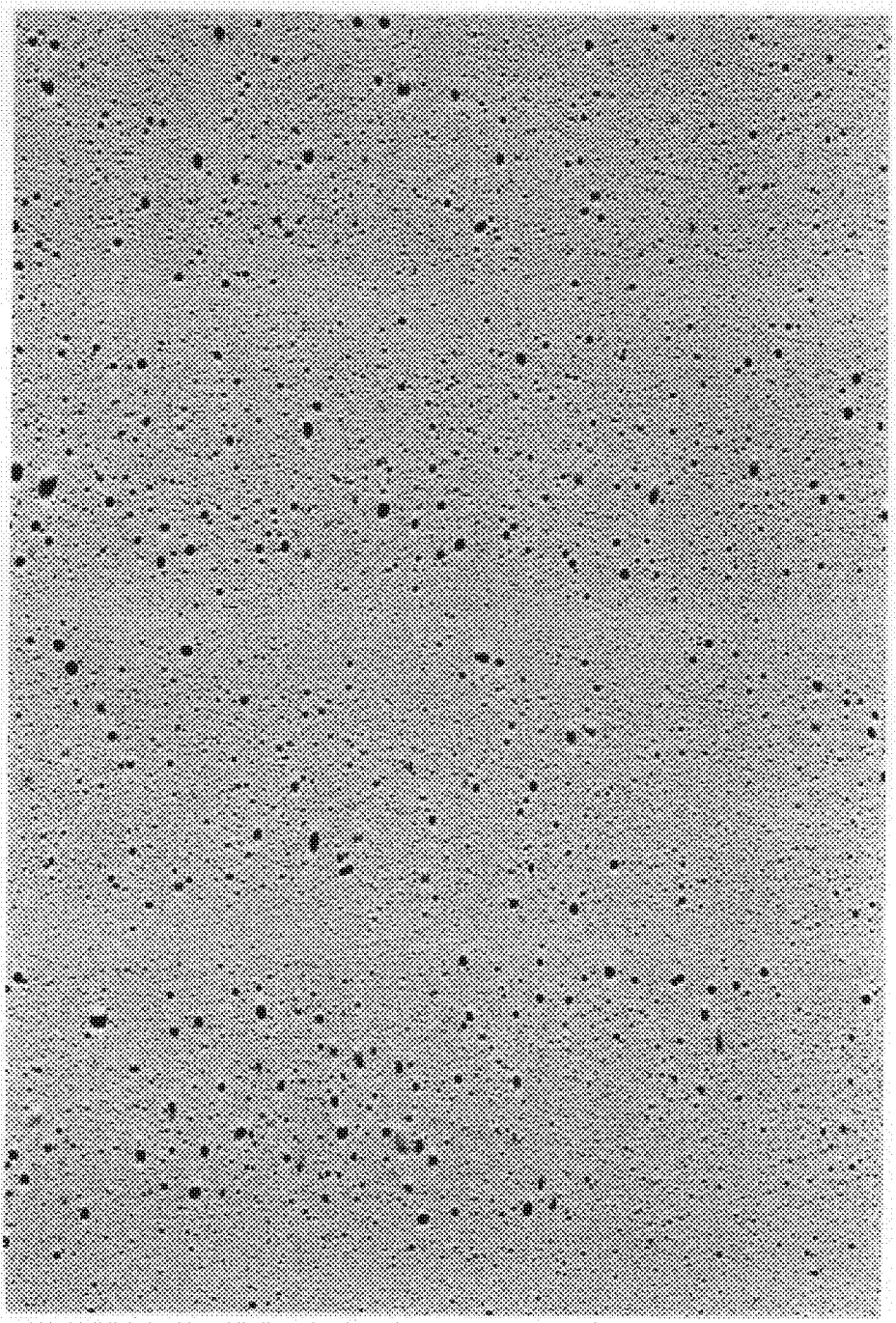
FIG. 6 is a photograph taken in Example 1 of a 100 mm by 150 mm area for void measurement.

In resol resin A was dissolved 3.5 g, per 100 g of the resol resin, of a silicone type surface active agent (polyalkylsiloxane-polyoxyalkylene copolymer, Paintad 32, available from Dow Corning Asia Ltd.). The resulting resol resin mixture, a blowing agent (a mixture consisting of 50 wt % of normal pentane (99+%, available from Wako Pure Chemical) and 50 wt % of isobutane (purity: ≧99%, available from SK Sangyo K.K.) and having nitrogen dissolved therein in a concentration of 0.3 wt % based on the blowing agent), and a curing catalyst (a mixture consisting of 50 wt % of paratoluenesulfonic acid monohydrate (95+%, available from Wako Pure Chemical) and 50 wt % of diethylene glycol (98+%, available from Wako Pure Chemical) were supplied to a pin mixer with a temperature controlling jacket in a ratio of 100 parts by weight, 6 parts by weight, and 17 parts by weight, respectively. At this time the mixer temperature was 58° C., and the mixer pressure was 6.8 kg/cm$^2$ (absolute). The mixture coming from the mixer had started expanding, showing a so-called froth-foamed state. The froth was poured in a mold having nonwoven cloth (Spunbond E1040, available from Asahi Chemical Ind. Co., Ltd.) laid therein. After the thickness was leveled, the upper surface was covered with the same nonwoven cloth, and the mold was closed. The mold was designed so that water generated during curing might be released. The mold was kept in an oven at 70° C. for 30 minutes, in an oven at 90° C. for 1 hour and then in an oven at 100° C. for 1 hour. The results of measurements made on the resulting phenolic foam are shown in Table 3. The electron micrograph taken for measurement of holes or depressions at a magnification of 5000 times is shown in FIG. 2. The photograph of a cut surface for void measurement is shown in FIG. 6.

EXAMPLES 2 to 13 and COMPARATIVE EXAMPLE 1

Figure 3:
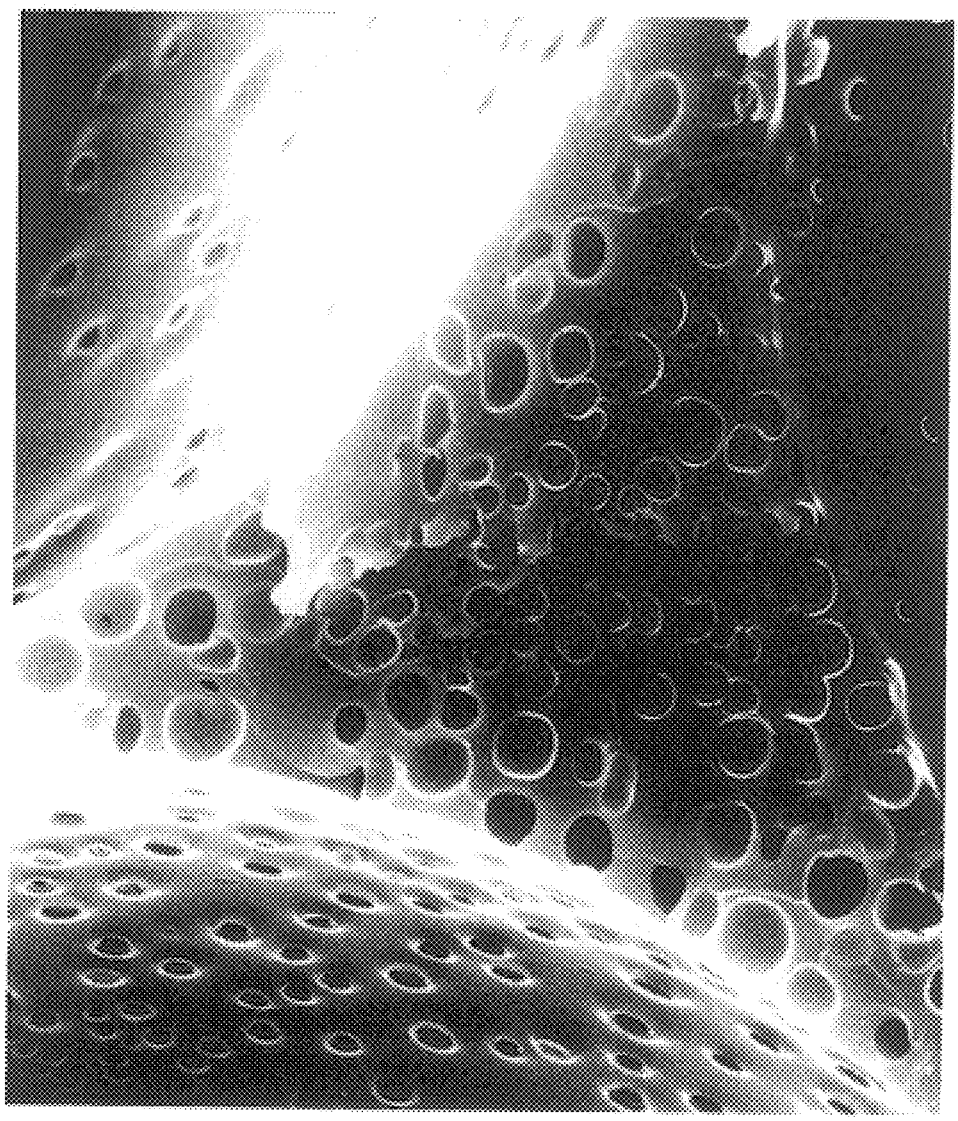
FIG. 3 is an electron micrograph of the cell wall cut surface of Comparative Example 1 which has holes or depressions.
Figure 7:
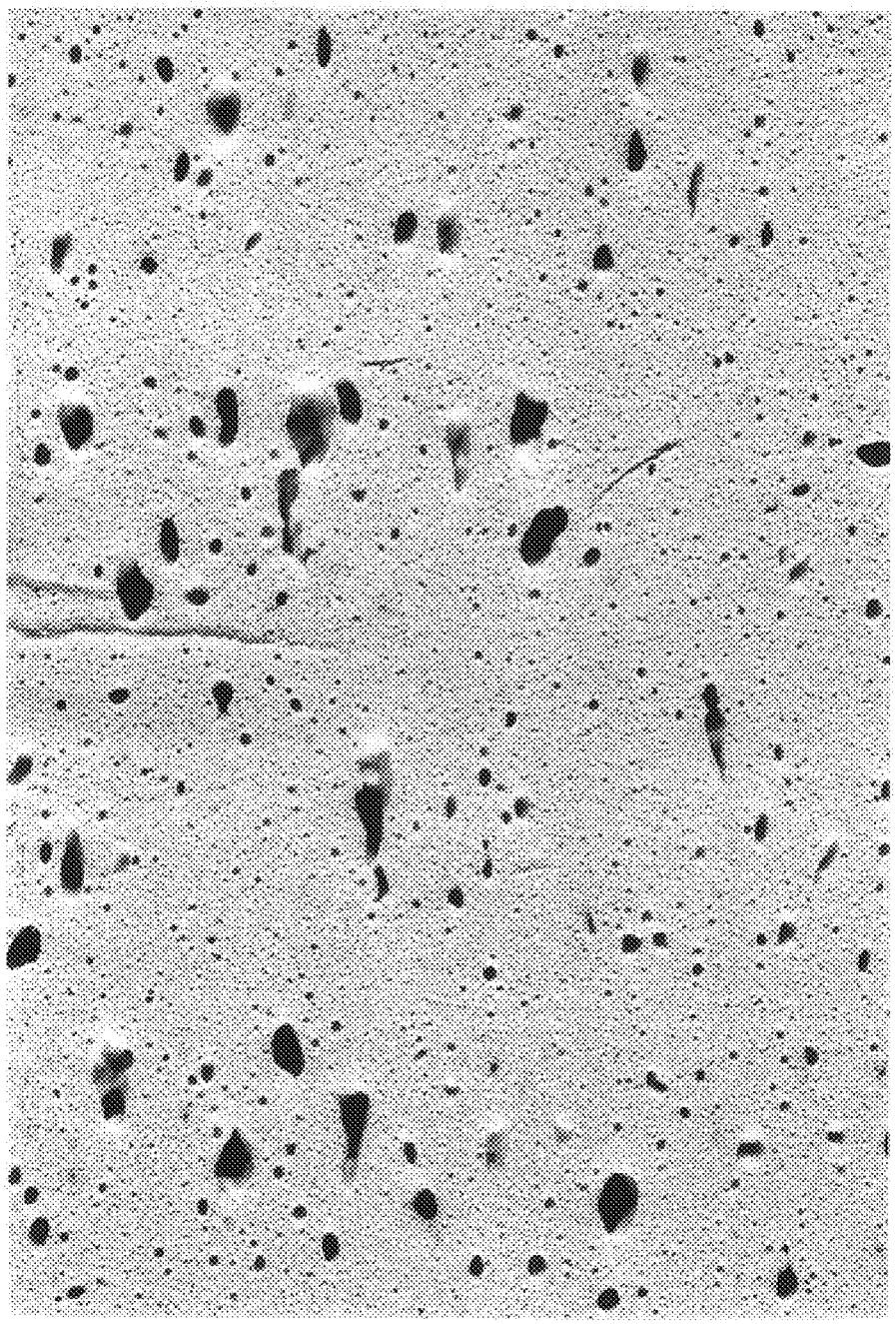
FIG. 7 is a photograph taken in Comparative Example 1 of a 100 mm by 150 mm area for void measurement.

The same procedure of Example 1 was followed, except for alterations to the resol resin, the composition of the blowing agent, the mixer temperature, and the mixer pressure as shown in Table 2. The physical properties of the resulting foam are shown in Table 3. The electron micrograph taken for holes or depressions measurement at a magnification of 5000 times is shown in FIG. 3. The photograph of a cut surface for void measurement is shown in FIG. 7.

COMPARATIVE EXAMPLE 2

The same procedure of Example 1 was followed, except that alterations were made to the resol resin, the composition of the blowing agent, the mixer temperature, and the mixer pressure as shown in Table 2 and that the curing step was carried out at 80° C. for 5 hours. The physical properties of the resulting foam are shown in Table 3.

COMPARATIVE EXAMPLE 3

The same procedure of Example 1 was followed, except for using, as a blowing agent, a 1:1 by weight mixture of normal pentane having dissolved therein 5 wt % of paraffin (first grade reagent available from Wako Pure Chemical; melting point: 44° C. to 46° C.) and 0.3 wt % of nitrogen and isobutane, changing the mixer temperature and the mixer pressure to 74° C. and 8.5 kg/cm$^2$, and changing the curing conditions to 80° C. and 5 hours. The physical properties of the resulting foam are shown in Table 3.

COMPARATIVE EXAMPLE 4

The same procedure of Example 1 was followed, except for using, as a blowing agent, a 1:1 by weight mixture of normal pentane having dissolved therein 3 wt % of perfluoroether (Galden HT-70, available from Ausimont S.p.A.) and 0.3 wt % of nitrogen and isobutane, changing the mixer temperature and the mixer pressure to 74° C. and 8.4 kg/cm$^2$, and changing the curing conditions to 80° C. and 5 hours. The physical properties of the resulting foam are shown in Table 3.

COMPARATIVE EXAMPLE 5

The same procedure of Example 1 was followed, except for making alterations to the resol resin and the mixer pressure as shown in Table 2. The physical properties of the resulting foam are shown in Table 3.

COMPARATIVE EXAMPLE 6

The same procedure of Example 1 was followed, except for making alterations to the resol resin and the mixer temperature and pressure as shown in Table 2 and changing the curing conditions to 110° C. and 3 hours. The physical properties of the resulting foam are shown in Table 3.

COMPARATIVE EXAMPLE 7

Figure 4:
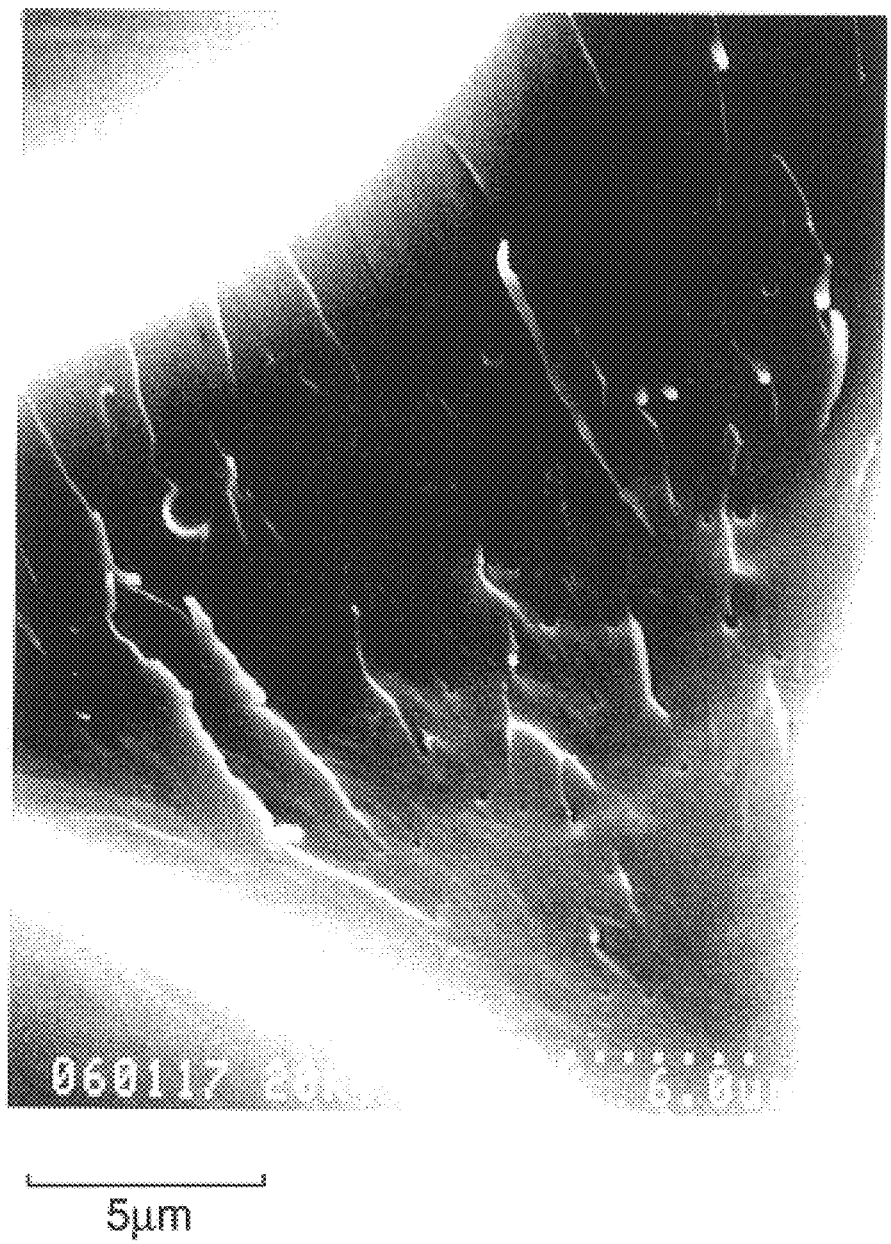
FIG. 4 is an electron micrograph of the cell wall cut surface of Comparative Example 7 which has holes or depressions.

A weighed quantity (47.75 g) of resol resin F and a 1:1 by weight mixture of an alkyl phenol ethoxy ester (Harfoam PI, available from Huntsman Chemical Co.) and an ethylene oxide-propylene oxide block copolymer (Pluronic F127, available from BASF) were mixed in a 2.25 g cup. With the mixture in the cup was further mixed 4.5 g of normal pentane at room temperature by stirring. To the mixture was further added while stirring 5 g of a curing catalyst composition which was a mixture of 35 g of resorcinol, 43.3 g of diethylene glycol, and 21.7 g of anhydrous toluene-xylenesulfonic acid (Ultra TX, available from Witco Chemical Co.). The contents of the cup was transferred into a mold which had previously been heated to 75° C. The mold was closed with a lid and put in an oven at 75° C. After 20 minutes, the foam was removed from the mold and further cured at 70° C. for 3 hours. The electron micrograph taken at a magnification of 5000 times for holes and depressions measurement is shown in FIG. 4. The physical properties of the resulting foam are shown in Table 3.

COMPARATIVE EXAMPLE 8

Figure 5:
FIG. 5 is an electron micrograph of the cell wall cut surface of Comparative Example 8 which has holes or depressions.

To 100 parts by weight of resol resin G was added a previously prepared mixture consisting of 4.0 parts by weight of castor oil ethoxylate X (54 mol of ethylene oxide per mole of castor oil) and 8.0 parts by weight of castor oil ethoxylate Y (54 mol of ethylene oxide per mole of castor oil). To the mixture was added a previously prepared mixture of 8.9 parts by weight of normal pentane and 2.2 parts by weight of perfluoropentane (PF-5050, available from 3M) at room temperature to form an emulsion. To the emulsion was added 17.5 parts of 50% sulfuric acid and mixed together. The mixture was poured into a mold, and the mold was put in an oven at 60° C. for 1 hour to cure the foam. After 24 hours from the preparation, the foam was cut to measure the physical properties. The electron micrograph taken for holes or depressions measurement at a magnification of 5000 times is shown in FIG. 5. The physical properties of the resulting foam are shown in Table 3.

In Table 3, the mark "-" means "not measured". In Comparative Examples 1 to 6, since the compressive strength measurements showed spread due to a high void, the breadths of the spread are shown.

TABLE 1

| Resol Resin | 40° C. Viscosity (cP) | Water Content (%) | Viscosity Increase Rate Constant (l/min) |
|---|---|---|---|
| A | 5100 | 6.2 | 0.08 |
| B | 3300 | 5.9 | 0.34 |
| C | 4000 | 6.4 | 0.04 |
| D | 5200 | 5.3 | 0.32 |
| W | 6000 | 8.5 | 0.65 |
| F | 5300 | 7.4 | 0.15 |
| G | 320 | 9.2 | 0.01 |

TABLE 2

| | Resin | Compositional Ratio of Blowing Agent (%) | | | Nitrogen (wt % based on blowing agent) | Mixing Conditions | | Blowing Agent Vapor Pressure*[1] (kg/cm$^2$) |
|---|---|---|---|---|---|---|---|---|
| | | | | | | Temp. (° C.) | Pressure*[1] (kg/cm$^2$) | |
| Example 1 | A | n-pentane/50 | isobutane/50 | — | 0.3 | 58 | 6.8 | 5.5 |
| Example 2 | B | n-pentane/50 | isobutane/50 | — | 0.3 | 53 | 6.2 | 4.9 |
| Example 3 | C | isopentane/50 | isobutane/50 | — | 0.3 | 46 | 5.5 | 4.3 |
| Example 4 | D | isopentane/50 | isobutane/50 | — | 0.3 | 58 | 6.8 | 5.7 |
| Example 5 | A | isopentane/50 | isobutane/50 | — | 0.3 | 54 | 6.6 | 5.2 |
| Example 6 | A | isopentane/100 | — | — | 0.3 | 57 | 4.1 | 2.5 |
| Example 7 | A | n-pentane/100 | — | — | 0.3 | 63 | 3.9 | 2.4 |
| Example 8 | A | n-pentane/50 | n-butane/50 | — | 0.3 | 47 | 4.7 | 3.2 |
| Example 9 | A | isopentane/50 | n-butane/50 | — | 0.3 | 51 | 4.6 | 3.8 |
| Example 10 | A | isopentane/90 | F-134a/10 | — | 0.3 | 55 | 5.0 | 3.3 |
| Example 11 | A | n-pentane/60 | F-134a/40 | — | 0.3 | 63 | 8.8 | 7.5 |
| Example 12 | A | isopentane/40 | isobutane/40 | F-134a/20 | 0.3 | 62 | 9.4 | 7.9 |
| Example 13 | A | n-pentane/40 | n-butane/30 | F-134a/30 | 0.3 | 61 | 8.9 | 7.2 |
| Comp. Example 1 | E | n-pentane/50 | isobutane/50 | — | 0.3 | 61 | 7.1 | 5.9 |
| Comp. Example 2 | A | n-pentane/50 | isobutane/50 | — | 0.3 | 73 | 8.3 | 7.7 |
| Comp. Example 3 | A | n-pentane/50 | isobutane/50 | — | 0.3 | 74 | 8.5 | 7.9 |
| Comp. Example 4 | A | n-pentane/50 | isobutane/50 | — | 0.3 | 74 | 8.4 | 7.9 |
| Comp. Example 5 | D | n-pentane/50 | isobutane/50 | — | 0.3 | 58 | 15.0 | 5.5 |
| Comp. Example 6 | B | n-pentane/50 | isobutane/50 | — | 0.3 | 54 | 6.1 | 5.0 |
| Comp. Example 7 | F | n-pentane/100 | — | — | — | *[2] | *[3] | — |

TABLE 2-continued

| | Resin | Compositional Ratio of Blowing Agent (%) | Nitrogen (wt % based on blowing agent) | Mixing Conditions Temp. (° C.) | Pressure*1 (kg/cm²) | Blowing Agent Vapor Pressure*1 (kg/cm²) |
|---|---|---|---|---|---|---|
| Comp. Example 8 | G | n-pentane/80 perfluoro-pentane/20 | — | — | *2 *3 | — |

*1Absolute pressure;
*2Standard temperature;
*3Standard pressure

TABLE 3

| | Density (kg/m³) | Closed Cell Ratio (%) | Average Cell Diameter (μm) | HC Content (wt %) | Thermal Conductivity*2 Immed. after Prepn. | 200 Dys. after | 300 Dys. after | Compressive Strength (kg/cm²) | Brittleness (%) | Holes or Depressions*1 | Void (%) |
|---|---|---|---|---|---|---|---|---|---|---|---|
| Example 1 | 28 | 96 | 102 | 4.3 | 0.0173 | 0.0176 | 0.0176 | 1.8 | 13 | ○ | 0.5 |
| Example 2 | 31 | 90 | 96 | 3.8 | 0.0179 | — | — | 2.1 | 15 | ○ | 0.4 |
| Example 3 | 30 | 93 | 89 | 4.0 | 0.0177 | 0.0179 | 0.0180 | 1.9 | 10 | ○ | 0.6 |
| Example 4 | 29 | 92 | 97 | 4.1 | 0.0180 | — | — | 1.8 | 13 | ○ | 0.7 |
| Example 5 | 29 | 92 | 93 | 4.1 | 0.0176 | — | — | 1.9 | 11 | ○ | 0.5 |
| Example 6 | 27 | 94 | 88 | 5.0 | 0.0175 | 0.0178 | 0.0178 | 1.7 | 8 | ○ | 0.3 |
| Example 7 | 28 | 95 | 85 | 4.8 | 0.0182 | — | — | 1.8 | 6 | ○ | 0.4 |
| Example 8 | 28 | 91 | 93 | 4.3 | 0.0180 | — | — | 1.8 | 13 | ○ | 0.5 |
| Example 9 | 29 | 93 | 103 | 4.1 | 0.0176 | — | — | 1.9 | 14 | ○ | 1.1 |
| Example 10 | 30 | 91 | 112 | 4.1 | 0.0170 | 0.0173 | 0.0174 | 2.0 | 15 | ○ | 1.3 |
| Example 11 | 30 | 89 | 121 | 3.0 | 0.0167 | — | — | 1.9 | 13 | ○ | 1.6 |
| Example 12 | 29 | 90 | 108 | 3.6 | 0.0171 | — | — | 1.8 | 14 | ○ | 1.1 |
| Example 13 | 29 | 91 | 117 | 3.3 | 0.0169 | — | — | 1.8 | 13 | ○ | 2.0 |
| Comp. Example 1 | 35 | 75 | 170 | 3.0 | 0.0223 | 0.0291 | 0.0298 | 0.9–1.9 | 38 | x | 8.8 |
| Comp. Example 2 | 28 | 91 | 133 | 4.3 | 0.0195 | — | — | 1.1–1.6 | 17 | ○ | 6.4 |
| Comp. Example 3 | 29 | 92 | 124 | 4.0 | 0.0195 | — | 0.0217 | 1.0–1.5 | 15 | ○ | 6.2 |
| Comp. Example 4 | 29 | 90 | 120 | 4.1 | 0.0190 | — | — | 0.9–1.7 | 18 | ○ | 6.5 |
| Comp. Example 5 | 27 | 83 | 182 | 4.2 | 0.0205 | — | — | 0.7–1.4 | 34 | Δ | 6.5 |
| Comp. Example 6 | 28 | 77 | 189 | 4.1 | 0.0225 | 0.0289 | — | 1.1–1.4 | 26 | x | 3.5 |
| Comp. Example 7 | 24 | 88 | 230 | 5.6 | 0.0193 | 0.0214 | 0.0221 | 0.8 | 32 | Δ | — |
| Comp. Example 8 | 38 | 85 | 260 | 3.7 | 0.0188 | 0.0219 | — | 1.6 | 37 | x | — |

*1○ = 10 or less; Δ = 11 to 50; x = 51 or more
*2Thermal conductivity (kcal/m · hr · ° C.)

As demonstrated in the Examples, the phenolic foams according to the present invention, which are prepared by using a hydrocarbon blowing agent, exhibits such excellent heat insulating performance that the thermal conductivity is 0.022 kcal/m·hr·° C. or less and hardly changes with time and have a so reduced void as can be handled stably even when shaped into as thin plates as 10 mm or less.

To the contrary, although the phenolic foams shown in Comparative Examples 2 to 4 have not more than 10 holes or depressions in the cell wall and exhibit excellent initial heat insulating performance, they undergo changes in heat insulating performance with time. Further, as compared with the present invention, they have such a high void that the compressive strength tends to be low and shows large scatter and that a thin sheet of 10 mm or thinner is liable to break.

The process shown in Comparative Examples 7 and 8 in which a liquid foaming composition is expanded and cured has a larger expansion ratio to form cells of greater diameter when compared with the froth process. Besides, the cell walls suffer from holes or depressions, which is considered ascribed to non-uniform expansion.

INDUSTRIAL APPLICABILITY

The phenolic foam according to the present invention exhibits excellent heat insulating performance, excellent mechanical strength such as compressive strength, and markedly reduced surface brittleness and therefore is suitable as a constructional heat insulating material. Further, the phenolic foam of the invention is environment-friendly because the blowing agent used involves no fear of destroying the ozonophere and has a small coefficient of global warming.

What is claimed is:

1. A phenolic foam having a density of 10 kg/m³ to 100 kg/m³ and containing a hydrocarbon, which is characterized by having an average cell diameter in a range of from 5 μm to 200 μm, a void area ratio of 5% or less in its cross section, and substantially no holes in the cell walls.

2. The phenolic foam according to claim 1, which has a closed cell ratio of 80% or more, a thermal conductivity of 0.022 kcal/m·hr·° C. or less, and a brittleness of 30% or less.

3. The phenolic foam according to claim 1, wherein the hydrocarbon is a constituent of a blowing agent.

4. The phenolic foam according to claim 2, wherein the hydrocarbon is a constituent of a blowing agent.

5. The phenolic foam according to claim 3, wherein the blowing agent comprises 50% by weight or more of the hydrocarbon.

6. The phenolic foam according to claim 4, wherein the blowing agent comprises 50% by weight or more of the hydrocarbon.

7. The phenolic foam according to claim 5, wherein the blowing agent contains 0.1 to 100 parts by weight of a fluorohydrocarbon per 100 parts by weight of the hydrocarbon.

8. The phenolic foam according to claim 6, wherein the blowing agent contains 0.1 to 100 parts by weight of a fluorohydrocarbon per 100 parts by weight of the hydrocarbon.

9. The phenolic foam according to any one of claims 1 to 3 and 4 to 8, wherein the hydrocarbon is at least one compound selected from isobutane, normal butane, cyclobutane, normal pentane, isopentane, cyclopentane, and neopentane.

10. The phenolic foam according to any one of claims 1 to 3 and 4 to 8, wherein the hydrocarbon is a mixture of 5 to 95% by weight of a butane selected from isobutane, normal butane and cyclobutane and 5 to 95% by weight of a pentane selected from normal pentane, isopentane, cyclopentane and neopentane.

11. The phenolic foam according to any one of claims 1 to 3 and 4 to 8, wherein the hydrocarbon is a mixture of 5 to 95% by weight of isobutane and 5 to 95% by weight of normal pentane and/or isopentane.

12. The phenolic foam according to claim 7 or 8, wherein the fluorohydrocarbon is at least one compound selected from 1,1,1,2-tetrafluorethane, 1,1-difluoroethane and pentafluoroethane.

13. A process for producing the phenolic foam of claim 1 comprising mixing a resol resin having a viscosity increase rate constant of 0.005 to 0.5, a water content of 4 to 12% by weight and a viscosity of 1000 to 30000 cps at 40° C., a surface active agent, a hydrocarbon-containing blowing agent, and a curing catalyst in a mixing machine having a temperature of 10 to 70° C. and a pressure of from the vapor pressure of the blowing agent to the blowing agent's vapor pressure plus 5 kg/cm$^2$, expanding the mixture, and elevating the temperature stepwise in a subsequent curing reaction stage.

14. The process for producing a phenolic foam according to claim 13, wherein the hydrocarbon-containing blowing agent comprises 50% by weight or more of a hydrocarbon.

15. The process for producing a phenolic foam according to claim 14, wherein the blowing agent contains 0.1 to 100 parts by weight of a fluorohydrocarbon per 100 parts by weight of the hydrocarbon.

* * * * *